April 9, 1935.   R. B. JOHNSON   1,997,178
ELECTRICAL EXAMINATION PAPER SCORING DEVICE
Original Filed July 30, 1932   2 Sheets-Sheet 1
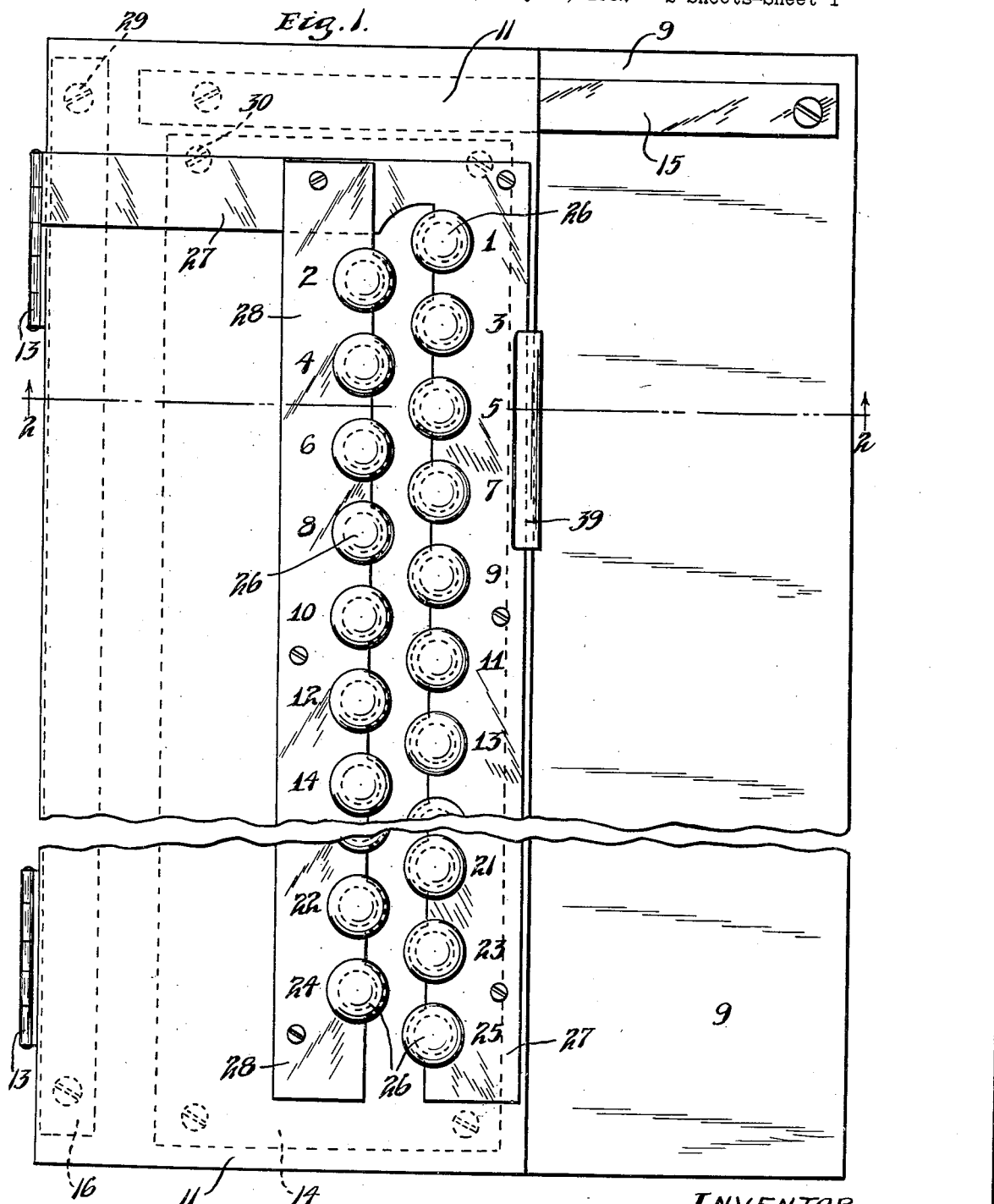
INVENTOR
REYNOLD B. JOHNSON.
BY HIS ATTORNEYS.
Williamson & Williamson April 9, 1935.  R. B. JOHNSON  1,997,178
ELECTRICAL EXAMINATION PAPER SCORING DEVICE
Original Filed July 30, 1932  2 Sheets-Sheet 2
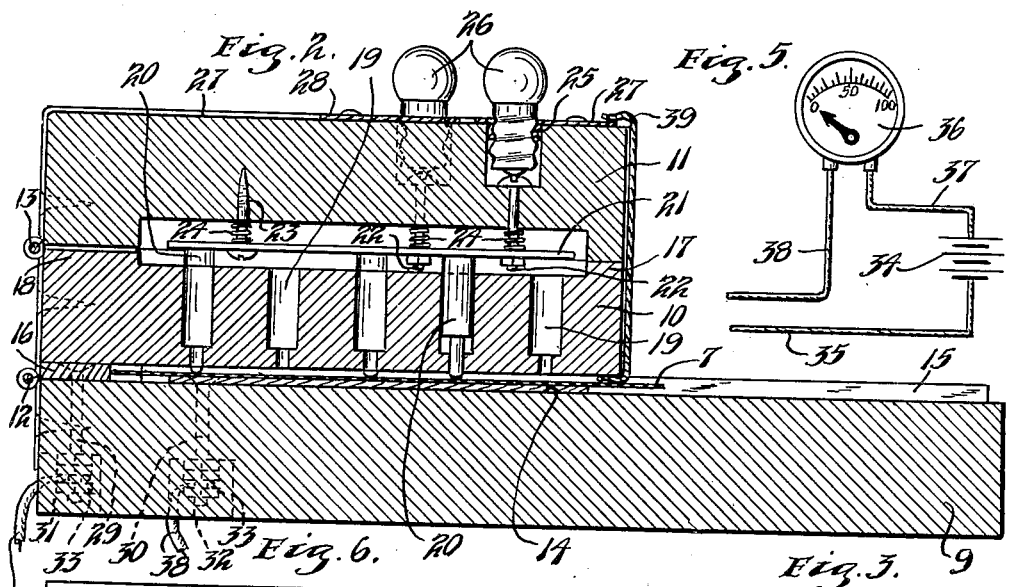
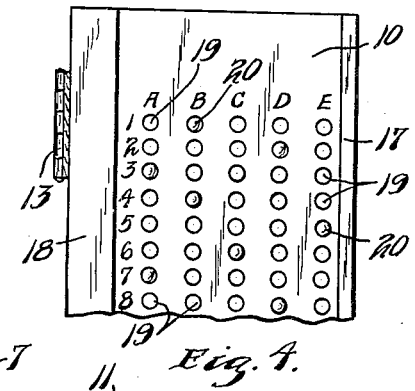
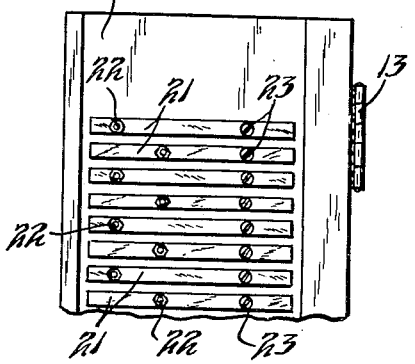
INVENTOR.
REYNOLD B. JOHNSON.
BY HIS ATTORNEYS.
Williamson & Williamson Patented Apr. 9, 1935

1,997,178

UNITED STATES PATENT OFFICE 1,997,178

ELECTRICAL EXAMINATION PAPER SCORING DEVICE

Reynold B. Johnson, Minneapolis, Minn., assignor to International Business Machines Corporation, New York, N. Y., a corporation of New York Application July 30, 1932, Serial No. 626,873
Renewed September 13, 1934

8 Claims. (Cl. 35—12)

My invention relates to apparatus for grading examination papers and more particularly to apparatus for electrically determining the number of correct answers on an examination paper.

In many schools and colleges, in conducting examinations, question sheets are used whereon a series of numbered or lettered answers, only one of which is correct, are printed below each question. In a space provided for the purpose the student writes the numeral or letter identifying the answer which he believes to be correct. Considerable work and time are used in correcting a large number of examination papers, and considerable chance of error in grading such papers exists. Also the cost of material and printing for such combined question and answer sheets is considerable.

It is an object of my invention to provide apparatus wherein the relatively expensive question sheets may be used repeatedly, wherein the answers selected by the students may be indicated on inexpensive answer cards or answer sheets, and wherein the answer sheets may be easily, quickly, and accurately graded without the necessity of inspecting the actual answers.

Another object is to provide a grading device wherein examination papers or cards of suitable form may be placed and wherein indicating means is provided to immediately indicate the number of correct answers or of erroneous answers to questions asked in the examination.

Still another object is to provide such a grading device wherein the correctly and incorrectly answered questions are respectively identified.

Yet another object is to provide such a grading device including indicating means which may be calibrated to directly indicate the grade of an examination paper in terms of zones or ranges.

A further object is to provide an apparatus of the class described wherein the examination papers or cards have frangible portions defining removable portions, which when removed leave apertures identifying the answers selected.

A still further object is to provide an apparatus of the class described wherein the grading device is electrically operated and provides indication by means of electrical indicating devices.

These and other objects and advantages of the invention will more fully appear from the following description, made in connection with the accompanying drawings, wherein like reference characters refer to the same or similar parts throughout the various views and, in which, Fig. 1 is a top view of my grading device;

Fig. 2 is a vertical cross-sectional view of my grading device taken along the lines 2—2 of Fig. 1;

Fig. 3 is a top view of a portion of the middle or contact carrying plate of my grading device;

Fig. 4 is a bottom view of a portion of the top plate;

Fig. 5 is an electrical connection diagram for the battery and ammeter used in connection with my grading device; and Fig. 6 is a view of the answer sheet used in my apparatus.

My invention consists of an apparatus comprising question sheets, answer sheets or cards, and an electrical grading device. The question sheets each have a series of numbered (or lettered) examination questions printed or otherwise shown thereon and a series of answers, only one of which is correct, associated with each question. The respective answers of each series are lettered (or numbered) for identification. The answer sheet or card has a vertical series of numbered (or lettered) horizontal rows of small, easily removable portions. Each row is marked to identify it as associated with one of the questions on the question sheet and each individual removable portion of each row is lettered (or numbered) corresponding to the identification marks associated with a series of answers. To answer a question in the examination the student removes a removable portion of the answer card in the row corresponding in number to the question to indicate the answer he has selected. Answer cards are placed one at a time in my electrical grading device which immediately indicates the portion of the questions which have been correctly answered.

Referring to the drawings, the answer sheet, as shown in Fig. 6, consists of a sheet 7 of paper or cardboard having therein a numbered (or lettered) series of parallel rows of small removable lettered (or numbered) portions 8, each of which is defined by a line of perforations 8a or a cut partially through the sheet and each of which is adapted to be easily pushed out or removed to leave an aperture. As shown in the drawings, guide lines to assist in writing identification data pertaining to each individual answer sheet may be printed thereon.

My grading device includes a rectangular base 9, a middle or contact carrying plate 10, and an upper plate 11, all of which are preferably constructed of insulating material. The contact carrying plate 10 is disposed immediately above the base 9 and the upper plate 11 is disposed immediately above the contact carrying plate 10. At one edge thereof the contact carrying plate 10 is swingably connected to the base 9 by means of hinges 12 and the upper plate 11 is similarly connected to the contact carrying plate 10 by means of hinges 13. The upper side of the base 9 is provided with a metal contact plate 14 secured thereto and aligned with the contact carrying plate 10 when the same is in operative position. Two guide bars 15 and 16, formed of metal are secured to the upper side of the base 9 respectively adjacent the upper edge and the left hand edge thereof as shown in Fig. 1.

The upper side of the contact carrying plate 10 is depressed except for the portions 17 and 18 immediately adjacent the longer edges thereof. The depressed portion is provided with a series of parallel rows of apertures 19 extending through the plate 10. The arrangement and spacing of the apertures 19 is similar to the arrangement and spacing of the removable portions of the answer sheet previously described. The lowermost portion of each aperture is of reduced diameter.

For each row of apertures is provided a metal contact pin 20 having an upper portion of suitable diameter to slidingly fit an aperture 19 and a lower portion of reduced diameter adapted to slidingly fit the lower portion of an aperture 19 and to extend a short distance below the lower side of the contact carrying plate 10. Each pin 20 is so proportioned that the upper end thereof will extend slightly above the uppermost portions 17 and 18 of the contact carrying plate 10 when the device is in operative position with the lower end of the pin 20 abutting the contact plate 14.

The lower side of the upper plate 11 is recessed similarly to the upper side of the contact carrying plate 10. Each of a series of contact bars 21, is aligned with a transverse row of apertures 19, is slightly longer than said row and is mounted for vertical movement by means of suitable apertures therein on mounting studs 22 and screws 23 which are respectively secured at their upper ends to the upper plate 11 as shown in Fig. 2. A helical compression spring 24 is disposed about each of the studs 22 and screws 23 between the respective contact bars 21 and the upper plate 11 to urge each bar 21 toward the lower limit of its movement.

The upper end of each of the studs 22 serves as the center contact of a lamp socket. An internally screw threaded metal shell 25 is mounted in a recess in the upper side of the upper plate 11 to cooperate with each center contact to form a lamp socket as shown in Fig. 2. A small electric lamp 26 is placed in each of the sockets thus formed.

All of the threaded shells 25 of the lamp sockets are connected together and to the hinge 13 by means of metal strips 27 and 28 as shown in Fig. 1 and Fig. 2. The hinges 13 are electrically connected to the hinges 12 and the hinges 12 are in turn connected to the metal guide bar 16. A pair of metal screws 29 and 30 extend respectively through apertures in the bar 16 and the metal contact plate 14 to recessed portions 31 and 32 of the lower side of the base 9. The lower end of each of the screws 29 and 30 is provided with nuts 33 to secure the screws 29 and 30 in place and to facilitate connection of electrical conductors to the screws.

One terminal of a source of electrical energy such as a battery 34 is connected to the screw 29 by means of an electrical conductor 35 and the remaining terminal is connected through a suitable ammeter 36 to the remaining one of the screws by means of electrical conductors 37 and 38 as shown.

A resilient substantially U-shaped clamping member 39 is provided to hold the free edges of the contact carrying plate 10 and the upper plate 11 together as shown in Fig. 1 and Fig. 2.

A series of numerals may be marked adjacent the series of lamps 26 as shown in Fig. 1 and and numerals and letters may be marked adjacent the apertures 19 as shown in Fig. 3.

Operation

In conducting an examination each person taking the examination is provided with a question sheet and an answer sheet, of which the former may be used repeatedly and the latter is used but once. The question sheet has thereon a numbered (or lettered) series of questions below each of which is a numbered (or lettered) series of answers, only one of the answers in the series thereof associated with each question being correct. The answer sheet has a numbered (or lettered) vertical series of horizontal rows of lettered (or numbered), partially perforated spots, the number of rows and the number of spots per row corresponding respectively to the number of questions and the number of answers associated with each question on the question sheet. The numbering (or lettering) of the rows and of the spots in each row of course corresponds to the numbering (or lettering) of the questions and associated answers on the question sheet. The student, in answering the examination questions, selects for each question on the question sheet one of the associated answers and indicates the selected answer by removing the partially perforated spot 8 on the answer sheet coresponding in identification numbers to the question and the selected answer thereto shown on the question sheet. When he has completed the examination, one partially perforated spot 8 of each row on the answer sheet will have been removed and all other spots will remain.

To grade an answer sheet, the same is placed upon the metal plate 14 of my grading device with the edges thereof in contact with the guide strips 15 and 16 and the contact carrying plate 10 is moved downwardly to cover the sheet. Contact pins 20 have been placed in the apertures 19 of the plate 10 aligned with the spots on the answer sheet corresponding to the correct answers and in no other apertures. In all instances where the answer is correct the contact pin 20 extends through the opening in the answer sheet left when the partially perforated spot has been removed and makes contact with the metal plate 14. In the instances where the answer is incorrect, the opening in the answer sheet will be aligned with an aperture 19 in the contact plate 10 containing no contact pin and the contact pin 20 in one of the other apertures of the same row will obviously be prevented from making contact with the metal plate 14 by a portion of the answer sheet in which no opening has been made.

In each case where the answer is correct and the contact pin 20 associated with that answer is permitted to make contact with the metal plate 14, a circuit to light the corresponding lamp 26 is established from one terminal of the battery 34 through 35, 29, 16, 12, 13, 27, 28, 25, 26, 22, 21, 20, 14, 30, 38, 26 and 37 to the other terminal of the battery.

When an answer sheet to be graded is placed in my grading machine it is apparent that the lamps 26 associated with correct answers will be illuminated and that lamps associated with incorrect answers will not be illuminated. The operator of my grading device can then by reference to the lamps, determine the number of correct answers, the number of incorrect answers, and which ones of the answers are correct (or incorrect).

The ammeter 36, which may or may not be used in the circuit, obviously indicates the combined current flowing to all of the illuminated lamps. The ammeter and lamps are so related in characteristics that the combined current, when all of the lamps are illuminated, will cause a full scale deflection of the ammeter. The ammeter may be provided with a scale of 0 to 100 and, if so provided, will obviously indicate directly, in terms of percentage. the grade of the answer sheet being graded. It is obvious that, when only a grade in terms of percentage is desired, suitable resistors may be substituted for the lamps shown in the drawings. It is also obvious that the scale of the ammeter may be divided into zones respectively marked "Excellent", "Good", "Fair", and "Poor", or marked in accordance with any other desired designations.

It is apparent that when statistical data are desired pertaining to an examination, the actuating coil of a conventional electrical counting device may be connected in series with the battery of my invention to record the total number of answer sheets graded and the coils of other similar electrical counting devices may be connected in series with the individual lamps to record the total number of answer sheets on which each of the corresponding questions were correctly answered. It is obvious that the number of answer sheets on which the respective answers are incorrect may be readily ascertained from data recorded as described above.

It is apparent that the answer sheets and the grading device of my apparatus may be constructed to accommodate any desired number of questions and answers.

It is apparent that I have invented novel and efficient apparatus for conducting examinations and grading the results of the same wherein relatively expensive question sheets may be used repeatedly, wherein inexpensive answer sheets may be used, and wherein the answer sheets may be very rapidly, easily, and accurately corrected or graded by persons not familiar with the subject of the examination and having very little training.

It is obvious that my apparatus is readily adaptable for use for many purposes other than the purpose of conducting examinations and grading the results thereof.

It will, of course, be understood that various changes may be made in the form, details, arrangement and proportions of the various parts without departing from the scope of the present invention.

What is claimed is:—

1. In apparatus for grading answers to questions in examinations wherein several answers, only one of which is correct, are associated with each question, an answer sheet having therein a plurality of frangible portions corresponding in number to said answers and marked for identification with respect thereto, said frangible portions being adapted to be broken away to form apertures to indicate the selected answers, and a grading device, said sheets being adapted to be placed in said device, and said device including electrical means adapted to cooperate with said apertures to respectively indicate the correct answers on said sheet.

2. In apparatus for grading answers to questions in examinations wherein several answers, only one of which is correct, are associated with each question, an answer sheet having therein a plurality of frangible portions corresponding in number to said answers and marked for identification with respect thereto, said frangible portions being adapted to be broken away to form apertures to indicate the selected answers, and a grading device, said sheets being adapted to be placed in said grading device, electrical contact elements included in said grading device, said contacts being adapted to cooperate with said apertures, a source of electrical energy, and electrical indicating devices connected in circuit with said contacts and said source, said grading device being adapted to respectively indicate the correct answers on said sheet.

3. In apparatus for grading examination papers, a grading device including a metal plate, a plate adapted to be placed upon and aligned with said metal plate, said second mentioned plate having a plurality of apertures therethrough and being constructed of insulating material, a plurality of contact pins adapted to be placed in said apertures to extend below said second mentioned plate, a series of electrical indicating devices, each of said pins being connected to one terminal of one of said devices, and a source of electrical energy, one terminal of said source being connected to said plate and the other terminal being connected to the remaining terminal of each of said devices.

4. In apparatus for grading examination papers, a grading device including a metal plate, a second plate formed of insulating material and adapted to be placed upon and aligned with said metal plate, said second plate having a series of rows of apertures therethrough, a contact pin associated with each of said rows and adapted to be placed in any aperture thereof to project slightly below said second plate, a contact bar situated above each of said rows and adapted to make contact with said pin, a series of electrical indicating devices corresponding in number to said rows, one terminal of each of said devices being connected to one of said bars, and a source of electrical energy, one terminal of said source being connected to said metal plate and the other terminal thereof being connected to the remaining terminal of each of said devices.

5. In apparatus for grading examination papers, a grading device comprising three plates, said plates being adapted to be placed in aligned parallel relation, means for effecting alignment of said plates, a sheet of metal secured to the upper face of the lowermost of said plates, the middle one of said plates having a series of rows of apertures therethrough, a plurality of pins adapted to be respectively inserted in various ones of said apertures, a series of metal bars mounted on the lower face of the upper one of said plates for limited movement in a vertical direction, resilient means for urging each of said bars toward the lower limit of its movement, each of said bars being positioned to register with one of said rows of apertures and to make contact with the upper end of a pin inserted in any aperture of said row, a series of electrical indicating devices each being associated with one of said bars, one terminal of each of said devices being connected to the associated bar, a source of electrical energy, one terminal of said source being connected to the remaining terminal of each of said devices and the remaining terminal of said source being connected to said sheet of metal.

6. In apparatus for grading an examination paper, a grading device including a metal plate, guide means for guiding said paper in placing the same in a predetermined position on said plate, a non-metallic plate having a series of rows of apertures therethrough, said non-metallic plate being adapted to be placed upon said sheet in a predetermined position, a plurality of metal pins, each adapted to be placed in any one of said apertures, resilient means tending to press pins located in said apertures into contact with said plate, an electrical indicating device associated with each of said rows, means for electrically connecting one terminal of each of said devices to pins in apertures of the associated row, and a source of electrical energy, one terminal of said source being connected to the remaining terminal of each of said devices, and the remaining terminal of said source being connected to said plate.

7. In apparatus for grading examination papers, an answer sheet having a series of rows of weakened spots adapted to be apertured, each of said rows being associated with a question and each spot in a row representing one of a number of answers to said question, only one of said answers being correct, and a grading device including a metallic plate upon which said sheet may be placed, a second plate adapted for being placed upon said sheet, a plurality of metallic contact elements mounted on said second plate and insulated from each other, said elements corresponding in number to said spots and being disposed to respectively register with certain spots on said sheet, each of said elements in combination with said metallic plate forming an electrical switch, a source of electrical energy, electrical indicating devices corresponding in number to said rows, each of said indicating devices being connected to said source through one of said switches, each of said switches being adapted to make contact if the corresponding spot on the answer sheet has been apertured.

8. In apparatus for grading answers to questions in examinations wherein several answers, only one of which is correct, are associated with each question, an answer sheet having therein a plurality of frangible portions corresponding in number to said answers and marked for identification with respect thereto, said frangible portions being adapted to be broken away to form apertures to indicate the selected answers, and a grading device, said sheets being adapted to be placed in said grading device, electrical contact elements included in said grading device, said contacts being adapted to cooperate with said apertures, a source of electrical energy, and electrical indicating means connected in circuit with said contacts and said source, said grading device being adapted to indicate the number of correct answers on said sheet.

REYNOLD B. JOHNSON.